United States Patent
Aiba et al.

(10) Patent No.: US 11,897,176 B2
(45) Date of Patent: Feb. 13, 2024

(54) INJECTION MOLDING MACHINE AND METHOD FOR INJECTION MOLDING

(71) Applicant: Sodick Co., Ltd., Kanagawa (JP)

(72) Inventors: Shuji Aiba, Kanagawa (JP); Hiroya Mukaide, Kanagawa (JP); Kenzo Akiyama, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 333 days.

(21) Appl. No.: 17/167,101

(22) Filed: Feb. 4, 2021

(65) Prior Publication Data

US 2021/0268708 A1 Sep. 2, 2021

(30) Foreign Application Priority Data

Mar. 2, 2020 (JP) ................................ 2020-034636

(51) Int. Cl.
*B29C 45/77* (2006.01)
*B29C 45/63* (2006.01)
(Continued)

(52) U.S. Cl.
CPC .............. *B29C 45/77* (2013.01); *B29C 45/47* (2013.01); *B29C 45/54* (2013.01); *B29C 45/63* (2013.01);
(Continued)

(58) Field of Classification Search
None
See application file for complete search history.

(56) References Cited

U.S. PATENT DOCUMENTS 5,362,222 A * 11/1994 Faig ................... G05B 19/4144
425/145
5,795,509 A 8/1998 Fujikawa et al.
(Continued)

FOREIGN PATENT DOCUMENTS

JP S49116156 11/1974
JP S5055666 5/1975
(Continued)

OTHER PUBLICATIONS

English translation of JPH02286314A (Year: 1990).*
(Continued)

*Primary Examiner* — Jacob T Minskey
*Assistant Examiner* — Adrien J Bernard
(74) *Attorney, Agent, or Firm* — JCIPRNET

(57) ABSTRACT

An injection molding machine having vent mechanism includes a plastication device, an injection device, a junction, a vent-up sensor, and a controller. The vent-up sensor detects vent-up. When the vent-up is detected, the controller switches from normal conditions to vent-up suppression conditions. The vent-up suppression conditions have at least one of the followings: increasing a rotational speed of the plastication screw to be higher than that in the normal conditions; using retreat-metering when the retreat-metering is not performed in the normal conditions, wherein in the retreat-metering, in addition to a pressure of the resin material, a force in a retreat direction is applied to the injection plunger to move the injection plunger at a predetermined retreat speed in the metering; and increasing the retreat speed of the injection plunger to be higher than that in the normal conditions when the retreat-metering is performed in the normal conditions.

8 Claims, 2 Drawing Sheets

(51) Int. Cl.
  *B29C 45/54* (2006.01)
  *B29C 45/47* (2006.01)
(52) U.S. Cl.
  CPC ............ *B29C 2945/7619* (2013.01); *B29C 2945/76163* (2013.01); *B29C 2945/76381* (2013.01); *B29C 2945/76605* (2013.01); *B29C 2945/76665* (2013.01); *B29C 2945/76859* (2013.01)

(56) References Cited

U.S. PATENT DOCUMENTS

| | | | |
|---|---|---|---|
| 6,284,167 | B1 | 9/2001 | Fujikawa |
| 2004/0140588 | A1* | 7/2004 | Endo ................ B29C 45/14065 264/279.1 |
| 2007/0196530 | A1 | 8/2007 | Shiraishi et al. |
| 2010/0258981 | A1* | 10/2010 | Marumoto ............ B29C 45/60 264/328.14 |
| 2018/0133940 | A1* | 5/2018 | Yokoyama .......... B29C 45/2737 |
| 2018/0319065 | A1* | 11/2018 | Holm .................... B29C 45/03 |

FOREIGN PATENT DOCUMENTS

| | | | | |
|---|---|---|---|---|
| JP | S577057 | | 2/1982 | |
| JP | S6422525 | | 1/1989 | |
| JP | H02286314 | A * | 11/1990 | ............ B29C 48/76 |
| JP | H05337993 | | 12/1993 | |
| JP | H0639119 | | 5/1994 | |
| JP | H06304979 | | 11/1994 | |
| JP | H09123241 | | 5/1997 | |
| JP | H09155942 | | 6/1997 | |
| JP | H11227013 | | 8/1999 | |
| JP | 2001062883 | | 3/2001 | |
| JP | 2001179778 | | 7/2001 | |
| JP | 2004255588 | | 9/2004 | |
| JP | 2005343026 | | 12/2005 | |
| JP | 2007253606 | | 10/2007 | |
| JP | 2016203615 | | 12/2016 | |
| JP | 6281999 | | 2/2018 | |
| JP | 2018079583 | | 5/2018 | |
| JP | 6507108 | | 4/2019 | |

OTHER PUBLICATIONS

"Office Action of Japan Related Application No. 2020-034636", dated Sep. 8, 2020, with English translation thereof, pp. 1-6.

"Office Action of Japan Related Application No. 2020-033115", dated Sep. 16, 2020, with English translation thereof, pp. 1-10.

* cited by examiner

INJECTION MOLDING MACHINE AND METHOD FOR INJECTION MOLDING

CROSS-REFERENCE TO RELATED APPLICATIONS

This application claims the priority benefit of Japanese Patent Application No. 2020-034636, filed on Mar. 2, 2020. The entirety of the above-mentioned patent application is hereby incorporated by reference herein and made a part of this specification.

BACKGROUND

TECHNICAL FIELD

The disclosure relates to an injection molding machine and a method for injection molding. Especially, the disclosure relates to a screw preplasticating injection molding machine having vent mechanism and a method for injection molding in the screw preplasticating injection molding machine having vent mechanism.

RELATED ART

An injection molding machine melts a resin material, meters a predetermined amount of the resin material, injects the metered resin material into a mold, and molds a desirable molded product. Injection molding machines which are currently in practical use are mainly and roughly divided into an in-line screw type and a screw preplasticating type.

In an in-line screw injection molding machine, a plastication device which melts the resin material and an injection device which meters and injects the melted resin material are formed integrally. Specifically, the in-line screw injection molding machine includes a plastication-injection cylinder, and an in-line screw which is arranged to rotate freely and to advance and retreat freely in the plastication-injection cylinder. In the in-line screw injection molding machine, the in-line screw rotates, melts the resin material supplied from the back of the plastication-injection cylinder, and sends the resin material to the front; and the in-line screw retreats to meter a predetermined amount of the resin material, and advances to inject the resin material after the metering.

In comparison, in a screw preplasticating injection molding machine, a plastication device which melts the resin material and an injection device which meters and injects the melted resin material are individually arranged. Specifically, the screw preplasticating injection molding machine includes: a plastication cylinder; a plastication screw which is arranged to rotate freely in the plastication cylinder; an injection cylinder; and an injection plunger which is arranged to advance and retreat freely in the injection cylinder. In the screw preplasticating injection molding machine, the plastication screw rotates, melts the resin material supplied from the back of the plastication cylinder, and sends the resin material to the injection cylinder; and the injection plunger in the injection cylinder retreats to meter the resin material, and advances to inject the resin material after the metering.

In either of the types, when the resin material is melted, a residual monomer, a volatile organic compound, and the like vaporize to be outgas. In addition, when the resin material is not sufficiently dried, moisture contained in the resin material becomes water vapor. Hereinafter, the outgas, the water vapor, and the like are simply referred to as gas. The gas is a reason for causing molding defects such as a silver streak, a burn mark, a blister, a bubble, a short shot, a defective transfer. In addition, the gas adhere inside a cavity, a gas vent, or the like of the mold as mold deposit, which causes shorten of a maintenance cycle of the mold.

As measures against the gas generated during melting, for example, an injection molding machine having vent mechanism is known as shown in Japanese Patent No. 6507108. On a cylinder of the injection molding machine having vent mechanism in which the resin material is melted, a vent hole is formed, and gas is discharged from the vent hole. Thereby, influence of the gas can be suppressed, and injection molding can be performed. The injection molding machine having vent mechanism is especially effective when using a resin material which generates a large amount of gas or an undried resin material.

SUMMARY

In the injection molding machine having vent mechanism, a phenomenon that is the so-called vent-up may occur in which the resin material overflows to the outside of the cylinder from the vent hole. If the vent hole is blocked by the resin material to which the vent-up occurs, deaeration from the vent hole cannot be performed. Furthermore, the resin to which the vent-up occurs may cause equipment failure, and may be a reason for contamination because of peeling off in a degraded state and being returned to the inside of the cylinder again.

Therefore, in a situation in which the vent-up occurs, regular removal of the resin material to which the vent-up occurs from the vent hole is required. This operation hinders a long-time unattended operation, and becomes a burden on an operator. In addition, in order to minimize the occurrence of the vent-up, attention to molding conditions is required.

The disclosure suppresses the vent-up and performs the injection molding.

According to the disclosure, provided is an injection molding machine, including: a plastication device which includes a plastication cylinder and a plastication screw, wherein a material inlet from which a resin material is supplied and a vent hole from which gas is discharged are formed on the plastication cylinder, and the plastication screw is arranged to rotate freely in the plastication cylinder, and melts and sends the resin material supplied from the material inlet; an injection device which includes an injection cylinder and an injection plunger, wherein the resin material is sent from the plastication cylinder to the injection cylinder, and the injection plunger is arranged to advance and retreat freely in the injection cylinder, retreats to meter the resin material, and advances to inject the resin material after metering; a junction which communicates the plastication cylinder and the injection cylinder; a vent-up sensor which detects vent-up in which the resin material overflows from the vent hole; and a controller which controls at least the plastication screw and the injection plunger according to predetermined molding conditions. When the vent-up is detected, the controller switches from normal conditions to vent-up suppression conditions and performs a control of molding, wherein the normal conditions are the molding conditions which are normal, and the vent-up suppression conditions are the molding conditions for suppressing the vent-up. The vent-up suppression conditions have at least one of the followings: increasing a rotational speed of the plastication screw to be higher than a rotational speed of the plastication screw in the normal conditions; using retreat-metering when the retreat-metering is not performed in the normal conditions, wherein the retreat-metering is a control to apply a force in a retreat direction in addition to a pressure of the resin material to the injection plunger to move the injection plunger at a predetermined retreat speed in the metering; and increasing the retreat speed of the injection plunger to be higher than the retreat speed of the injection plunger in the normal conditions when the retreat-metering is performed in the normal conditions.

In addition, according to the disclosure, provided is a method for injection molding of an injection molding machine, wherein the injection molding machine includes: a plastication device which includes a plastication cylinder and a plastication screw, wherein a material inlet from which a resin material is supplied and a vent hole from which gas is discharged are formed on the plastication cylinder, and the plastication screw is arranged to rotate freely in the plastication cylinder, and melts and sends the resin material supplied from the material inlet; an injection device which includes an injection cylinder and an injection plunger, wherein the resin material is sent from the plastication cylinder to the injection cylinder, and the injection plunger is arranged to advance and retreat freely in the injection cylinder, retreats to meter the resin material, and advances to inject the resin material after metering; a junction which communicates the plastication cylinder and the injection cylinder; a vent-up sensor which detects vent-up in which the resin material overflows from the vent hole; and a controller which controls at least the plastication screw and the injection plunger according to predetermined molding conditions. When the vent-up is detected, normal conditions are switched to vent-up suppression conditions and a control of molding is performed, wherein the normal conditions are the molding conditions which are normal, and the vent-up suppression conditions are the molding conditions for suppressing the vent-up. The vent-up suppression conditions have at least one of the followings: increasing a rotational speed of the plastication screw to be higher than a rotational speed of the plastication screw in the normal conditions; using retreat-metering when the retreat-metering is not performed in the normal conditions, wherein the retreat-metering is a control to apply a force in a retreat direction in addition to a pressure of the resin material to the injection plunger to move the injection plunger at a predetermined retreat speed in the metering; and increasing the retreat speed of the injection plunger to be higher than the retreat speed of the injection plunger in the normal conditions when the retreat-metering is performed in the normal conditions.

The injection molding machine according to the disclosure is a screw preplasticating injection molding machine having vent mechanism, and the vent hole is formed on the plastication cylinder. When the vent-up is detected, the rotational speed of the plastication screw is increased; the retreat-metering is performed in which in addition to the pressure of the resin material, the force in the retreat direction is applied to the injection plunger to move the injection plunger at the predetermined retreat speed in the metering; or the retreat speed of the injection plunger is increased; and thereby the vent-up can be suppressed, and molding can be continued.

DESCRIPTION OF THE EMBODIMENTS

Hereinafter, an embodiment of the disclosure is described with reference to the drawings. Various variation examples described below may be respectively implemented in any combination.

An injection molding machine of the embodiment is a screw preplasticating injection molding machine having vent mechanism. The injection molding machine of the embodiment includes an injection unit 100, a clamping unit (not shown), and a controller 7 which controls the injection unit 100 and the clamping unit. The injection unit 100 plasticizes a resin material, meters a predetermined amount of the resin material, and injects the resin material to a mold (not shown) which is held by the clamping unit. The clamping unit is configured to be capable of opening/closing and clamping the mold. When the resin material is injected, the clamping unit closes the mold and applies a clamping force of a predetermined pressure to the mold. After the resin material injected into a cavity of the mold is cooled and becomes a molded product, the clamping unit opens the mold to discharge the molded product and closes the mold again. As the clamping unit, a clamping unit of a well-known type such as a direct pressure type or a toggle type may be used.

Figure 1:
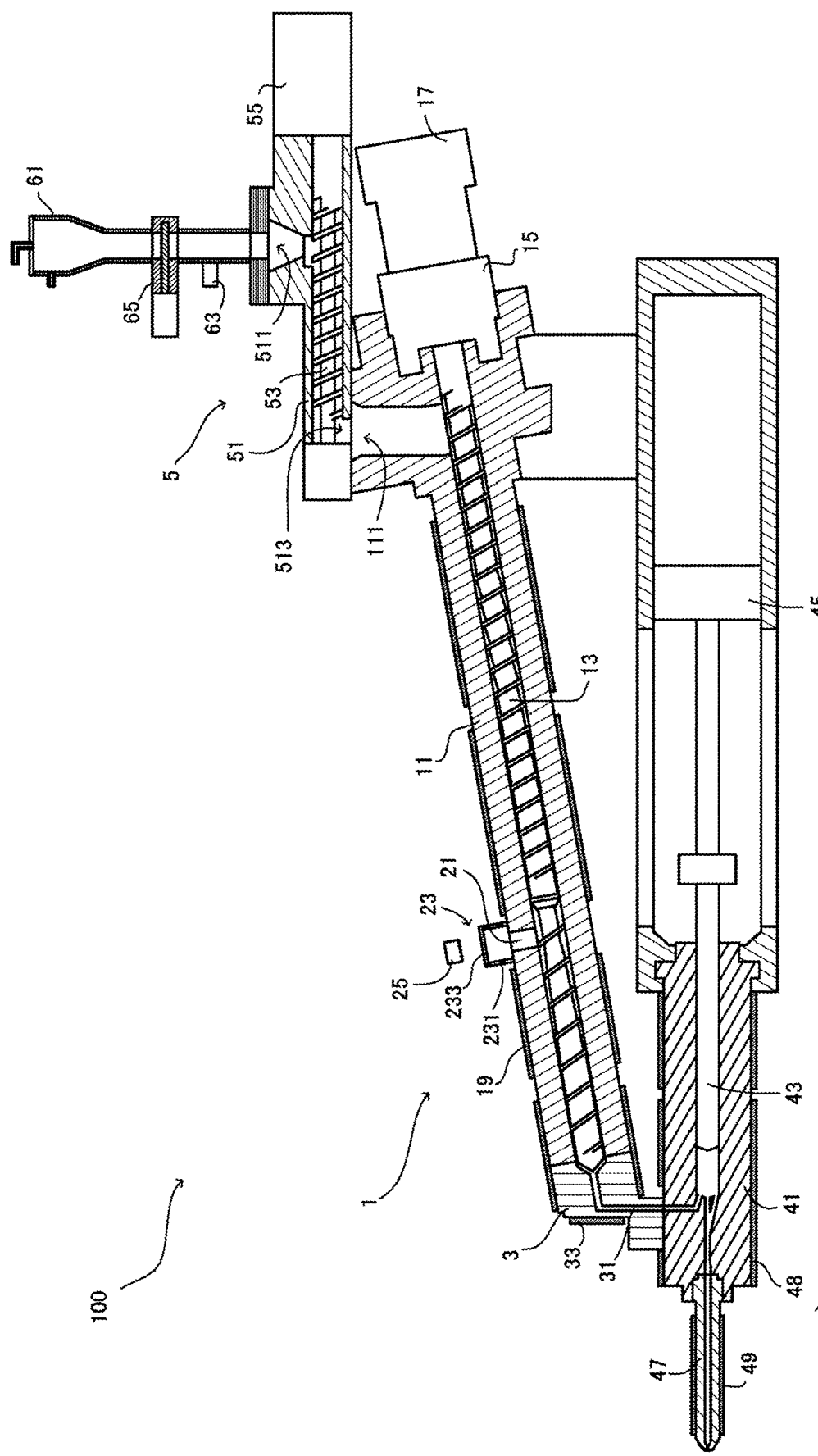
FIG. 1 is a schematic view of an injection unit in an injection molding machine according to an embodiment of the disclosure.

As shown in FIG. 1, the injection unit 100 includes a plastication device 1, a junction 3, and an injection device 4. In FIG. 1, a part of a configuration is shown by a cross sectional view. Besides, hereinafter, a left side in FIG. 1 is described as a front side, and a right side in FIG. 1 is described as a back side.

The plastication device 1 includes a plastication cylinder 11, a plastication screw 13, a backflow prevention unit 15, a plastication screw driving device 17, and heaters 19. The plastication cylinder 11 is a cylindrical body which is heated to a predetermined temperature by the heaters 19 such as band heaters. In an end portion on a back side of the plastication cylinder 11, a material inlet 111 from which the resin material is supplied is formed. The plastication screw 13 is arranged to rotate freely in the plastication cylinder 11. The plastication screw 13 melts, by heat generated by the heaters 19 and shearing heat, the resin material which is supplied from the material inlet 111 into the plastication cylinder 11, and sends the resin material to a front of the plastication cylinder 11. The backflow prevention unit 15 is, for example, a single acting cylinder, and at the completion time of metering, advances the plastication screw 13 to block a flow path and prevent backflow of the resin material during injection. Besides, another backflow prevention mechanism such as a ball valve may be arranged instead of the backflow prevention unit 15. The plastication screw driving device 17 may be any actuator which rotates the plastication screw 13, such as a hydraulic motor or an electric motor.

On a side surface of the plastication cylinder 11, a vent hole 21 is formed. From the vent hole 21, gas generated during the melting of the resin material is discharged. Here, the injection molding machine of the embodiment includes a vent-up sensor which detects vent-up in which the resin material overflows from the vent hole 21. In the embodiment, an optical vent-up sensor 25 is arranged above the vent hole 21. The vent-up sensor 25 measures a height of the resin material with respect to any reference position in the vent hole 21. When the height of the resin material exceeds a predetermined threshold value, it is determined that the vent-up is generated. Besides, another sensor may be arranged as the vent-up sensor. For example, the vent-up sensor may be a temperature sensor which measures a temperature in the vicinity of the vent hole 21, a contact sensor which performs a contact detection to a resin overflowing from the vent hole 21, or a pressure sensor which measures a resin pressure in the vicinity of the vent hole 21.

Besides, a vent chamber 23 having side walls 231 and a lid 233 may be arranged in a way of surrounding the vent hole 21. A vacuum pump (not shown) is connected to the side wall 231, and evacuation of the vent chamber 23 may be performed in the metering. By this configuration, removal of gas can be performed more efficiently. The lid 233 is configured to be openable/closable, and a transparent window for being capable of observing the vent hole 21 is arranged on the lid 233.

Hereinafter, the vent hole 21 is taken as a boundary, a back side of the plastication device 1 is referred to as a first zone, and a front side of the plastication device 1 is referred to as a second zone. The plastication screw 13 has, in order from the back side, a supply zone, a compression zone, a deaeration zone, and a metering zone. In the supply zone, a groove portion of the plastication screw 13 is formed relatively deep, and the resin material which is mainly unmelted is transferred to the front. In the compression zone, the groove portion of the plastication screw 13 is formed in a way of gradually becoming shallow, and the resin material which is melted is transferred to the front while a resin density is increased. The deaeration zone is arranged in the vicinity of the vent hole 21. In the deaeration zone, the groove portion of the plastication screw 13 is formed relatively deep, and the gas generated during melting of the resin material is deaerated from the vent hole 21. In metering zone, the groove portion of the plastication screw 13 is formed relatively shallow, the resin material which passed through the metering zone is sent to the injection device 4.

The junction 3 connects the plastication device 1 and the injection device 4. Specifically, a communication passage 31 which is arranged inside the junction 3 communicates the plastication cylinder 11 of the plastication device 1 and an injection cylinder 41 of the injection device 4. A heater 33 may be arranged in the junction 3, and the junction 3 is desirably heated to a predetermined temperature.

The injection device 4 includes the injection cylinder 41, an injection plunger 43, an injection plunger driving device 45, an injection nozzle 47, and heaters 48 and 49. The injection cylinder 41 is a cylindrical body which is heated to a predetermined temperature by the heaters 48 such as the band heaters. The melted resin material is sent to the injection cylinder 41 from the plastication cylinder 11 via the communication passage 31 of the junction 3. The injection plunger 43 is arranged to advance and retreat freely in the injection cylinder 41. The injection plunger driving device 45 may be any actuator which moves the injection plunger 43 forward and backward, such as a hydraulic cylinder or an electric cylinder. The injection nozzle 47 is arranged on a front of the injection cylinder 41 and abuts against a gate of the mold during the injection. The injection nozzle 47 is heated to a predetermined temperature by the heater 49. The injection plunger 43 retreats to meter a predetermined amount of the resin material and advances to inject the resin material to the mold from the injection nozzle 47.

In a screw preplasticating injection molding machine, the injection of the resin material is performed by the injection plunger 43, and the plastication screw 13 does not move during the injection. That is, during the injection, the resin material in the plastication cylinder 11 is not pressurized by the plastication screw 13. For this reason, the vent-up is relatively unlikely to occur in the screw preplasticating injection molding machine in comparison with that in an in-line screw injection molding machine.

Besides, during the metering, the injection plunger 43 retreats because of a pressure of the resin material sent from the plastication cylinder 11. At this time, a pressure in an advance direction may be applied to the injection plunger 43 within a range in which the injection plunger 43 retreats. This pressure is referred to as a back pressure. In addition, the back pressure is not required to be applied during the metering in the screw preplasticating injection molding machine, which is different from that in the in-line screw injection molding machine.

In addition, the metering may be performed while the injection plunger 43 is moved in a retreat direction. That is, in the metering, in addition to the pressure of the resin material, a force in the retreat direction of the injection plunger 43 may be applied. Hereinafter, this control is referred to as a retreat-metering. By performing the retreat-metering, the pressure of the resin material on a second stage can be reduced and the occurrence of the vent-up can be suppressed.

For example, a retreat speed of the injection plunger 43 during the retreat-metering is calculated by adding any set value to a reference speed. That is, during the retreat-metering, the injection plunger 43 is retreated at a speed faster than the reference speed. Here, the reference speed is a retreat speed of the injection plunger 43 during the metering when the back pressure applied to the injection plunger 43 and a sliding resistance is practically 0 Mpa. In other words, the reference speed is a retreat speed of the injection plunger 43 when the injection plunger 43 performs the metering while being retreated in a way that the sliding resistance is approximately 0 Mpa in a state that the back pressure is not applied to the injection plunger 43.

For example, the reference speed is calculated as follows. When a predetermined metering value A [mm] is metered, the injection plunger 43 is previously retreated to a position which is in front of the metering value A [mm] by a predetermined offset B [mm]. Specifically, the offset B [mm] is preferably about a few tenths of millimeters to a few millimeters, and specifically is 0.5 mm in the embodiment. Metering from 0 [mm] to (A-B) [mm] can be performed in ignorance of the sliding resistance of the injection plunger 43. Metering from (A-B) [mm] to A [mm] may be performed in a way that the injection plunger 43 is retreated by the pressure of the resin material as usual. Alternatively, metering from (A-B) [mm] to A [mm] may be performed in a way that the injection plunger driving device 45 retreats the injection plunger 43 little by little every time the injection plunger 43 receives a predetermined pressure until the injection plunger 43 reaches A [mm]. The pressure applied to the injection plunger 43 is detected by an encoder (not shown). At a stage where the injection plunger 43 reaches the metering value A [mm], the metering is completed. When the metering described above is performed, a timer (not shown) measures a metering time bt [s] which is a time from the start of metering to the completion of metering. The reference speed is calculated in a form of (A/bt) [mm/s].

Alternatively, the reference speed may be calculated as follows. In order to calculate the reference speed, the metering of the predetermined metering value A [mm] is performed. The metering is started from a position where the injection plunger 43 is at 0 [mm]. Until the injection plunger 43 reaches A [mm], the injection plunger driving device 45 retreats the injection plunger 43 little by little every time the injection plunger 43 receives the predetermined pressure. At a stage where the injection plunger 43 reaches the metering value A [mm], the metering is completed. When the metering time is bt [s], the reference speed is calculated in a form of (A/bt) [mm/s].

According to the calculation methods of the reference speed exemplified above, when the metering is performed with almost no sliding resistance being applied to the injection plunger 43, the retreat speed of the injection plunger 43 can be calculated as the reference speed. Besides, when there is a change in molding conditions in which the metering time can be changed, the reference speed is calculated again in the same procedure.

When a setting for performing the retreat-metering comes into ON, the retreat-metering is performed at least at a part of timing during the metering. Specifically, when the metering of the predetermined metering value A [mm] is performed, the retreat-metering is performed until a position which is in front of the metering value A [mm] by a predetermined offset C [mm]. Specifically, the offset C [mm] is preferably about a few tenths of millimeters to a few millimeters, and specifically is 0.5 mm in the embodiment. Metering from 0 [mm] to (A-C) [mm] is performed while the injection plunger 43 retreats at a retreat speed (A/bt+V) [mm/s] which is obtained by adding a predetermined set value V [m/s] to the reference speed (A/bt) [mm/s]. Metering from (A-C) [mm] to A [mm] may be performed in a way that the injection plunger 43 is retreated by the pressure of the resin material as usual. Alternatively, until the injection plunger 43 reaches A [mm], the injection plunger driving device 45 may retreat the injection plunger 43 little by little every time the injection plunger 43 receives the predetermined pressure. The retreat-metering is finished in a position slightly in front of the metering value, and thereby the occurrence of the vent-up can be suppressed, and the metering can be performed in a state that an entrainment of air and the like is suppressed.

Besides, the retreat speed of the injection plunger 43 during the retreat-metering may be corrected by the pressure received by the injection plunger 43 during the retreat-metering. A threshold value P of the pressure received by the injection plunger 43 is set previously. When a pressure which is equal to or greater than the P is discovered by the encoder (not shown) during the retreat-metering, a value, which is obtained by increasing a current retreat speed by a predetermined amount or in a predetermined proportion, may be set as a new retreat speed. In addition, the retreat speed of the injection plunger 43 during the retreat-metering may be calculated by the metering value and the metering time during metering which are obtained using the retreat-metering immediately before. That is, a retreat speed of the injection plunger 43 during the n-th retreat-metering may be a value which is obtained by dividing a (n-1)-th metering value by a (n-1)-th metering time.

The injection unit 100 desirably further includes a starved feeder 5. The starved feeder 5 is arranged on the material inlet 111 of the plastication cylinder 11 and performs a starved feeding of the resin material to the plastication cylinder 11. The starved feeding refers to a supply method of the resin material in which a small amount of materials less than materials falling down by a self-weight is quantitatively dropped, and the resin material is supplied with an amount within a range in which the supply zone of the plastication screw 13 is not filled with the resin material. Compared with supplying the resin material by the self-weight, performing the starved feeding can enable a void to be arranged in the plastication cylinder 11 to a certain degree for melting and transferring the resin material. Thereby, the vent-up is suppressed, and discharge of gas is promoted. The starved feeder 5 includes a feed cylinder 51, a feed screw 53, and a feed screw driving device 55. The feed cylinder 51 is a cylindrical body in which a supply opening 511 from which the resin material is supplied is formed on one end portion, and a discharge opening 513 from which the resin material is discharged to the material inlet 111 is formed on the other end portion. The feed screw 53 is arranged to rotate freely in the feed cylinder 51. The feed screw 53 sends the resin material supplied from the supply opening 511 to the discharge opening 513, and supplies the resin material to the material inlet 111. The feed screw driving device 55 may be any actuator which rotates the feed screw 53, such as a hydraulic motor or an electric motor.

Any device for supplying the resin material to the starved feeder 5 may be arranged. In the embodiment, a hopper loader including a hopper 61 and a loader (not shown) is arranged. The hopper 61 is installed on the supply opening 511 of the starved feeder 5. A material sensor 63 is arranged in the hopper 61, and when the material sensor 63 detects that the resin material in the hopper 61 is lower than a predetermined amount, the resin material is transferred to the hopper 61. The loader which transports the resin material to the hopper 61 may be a suction loader which transports the resin material from a tank (not shown) by reducing a pressure in the hopper 61, or a pressure feeding loader which places the hopper 61 in a flow of air to transport the resin material from the tank.

If the loader is the suction loader or the pressure feeding loader, an atmospheric pressure in the hopper 61 changes when the resin material is transported to the hopper 61. Accordingly, an atmospheric pressure in the feed cylinder 51 of the starved feeder 5 which is connected to the hopper 61 may also change, the resin material in the feed cylinder 51 is sucked up or pushed out, and a stable supply cannot be performed. Therefore, when the resin material is transported to the hopper 61, a passage between the hopper 61 and the supply opening 511 is desirably closed. For example, an openable/closeable shutter 65 may be arranged on the hopper 61 or between the hopper 61 and the supply opening 511 of the starved feeder 5. The shutter 65 is closed when the hopper loader transports the resin material to the hopper 61.

The controller 7 performs a control of the injection molding machine based on predetermined molding conditions. The molding conditions includes, for example, a rotational speed of the plastication screw 13, a rotational speed of the feed screw 53, the metering value, an injection speed, a V-P switching position, a dwelling pressure, a dwelling time, the back pressure, ON/OFF of the retreat-metering, the retreat speed of the injection plunger 43 during the retreat-metering, temperatures of the heaters 19, 33, 48, and 49, the clamping force. The V-P switching position refers to a switching position of a speed control and a pressure control. In addition, when the vent-up is detected, the controller 7 performs the control of the injection molding machine based on molding conditions (hereinafter referred to as vent-up suppression conditions) for suppressing the vent-up instead of normal molding conditions (hereinafter referred to as normal conditions). Based on normal conditions or vent-up suppression conditions, the controller 7 controls each portion of the injection molding machine to perform a control of molding so that the injection molding machine melts the resin material, meters the predetermined amount of the resin material, and injects the metered resin material into the mold, for molding the desirable molded product.

Figure 2:
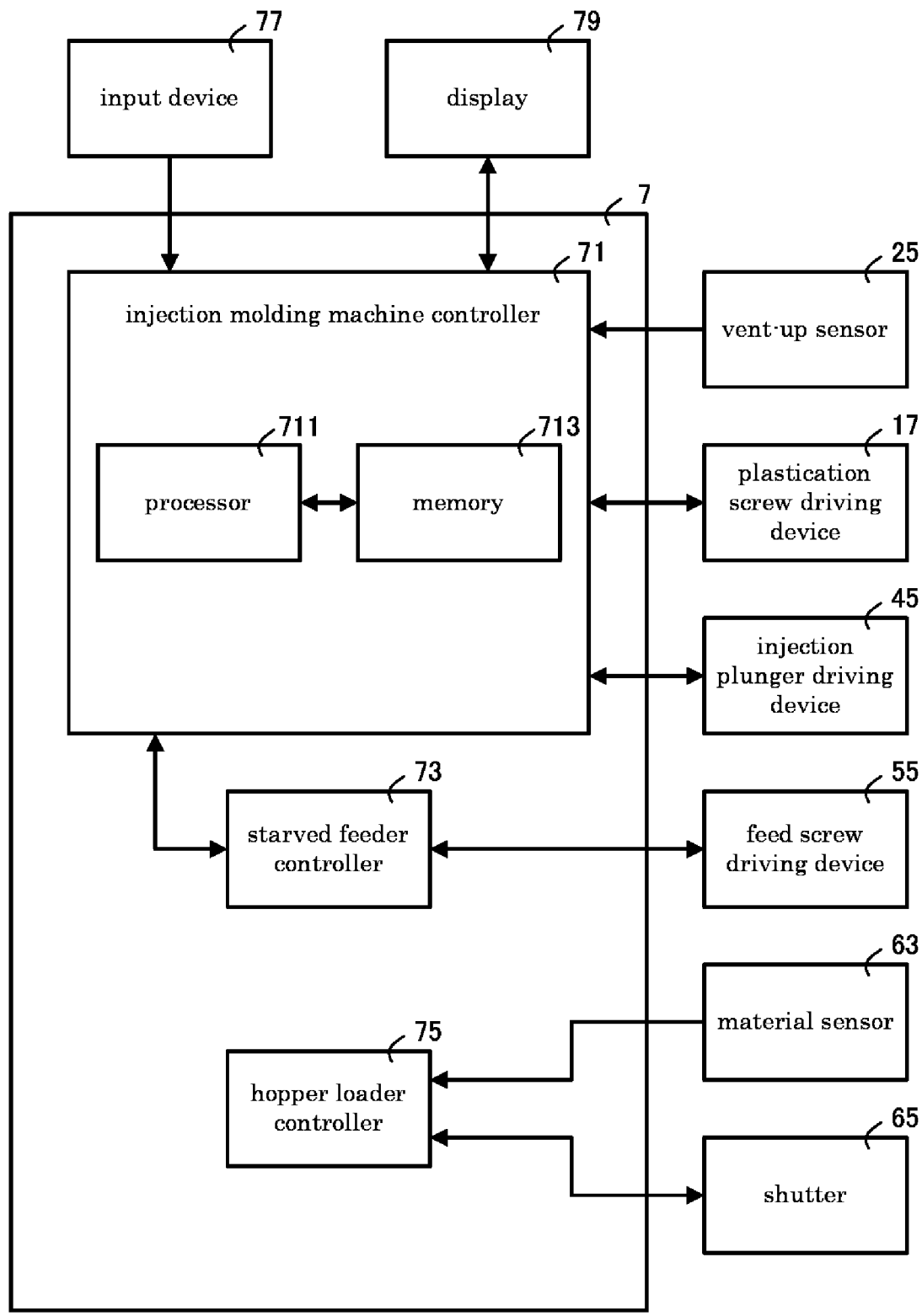
FIG. 2 is a block diagram of a controller.

As shown in FIG. 2, the controller 7 includes an injection molding machine controller 71, a starved feeder controller 73, and a hopper loader controller 75. Besides, in FIG. 2, illustrations of members having no direct relation with the claimed disclosure are omitted. In addition, the controller 7 shown in FIG. 2 is simply an example, and another configuration may be used within a range in which the disclosure can be implemented. For example, in the controller 7 of the embodiment, the injection molding machine controller 71, the starved feeder controller 73, and the hopper loader controller 75 are respectively and separately arranged, but may be integrally arranged. The controller 7 is configured to be capable of controlling at least the plastication screw 13 and the injection plunger 43.

The injection molding machine controller 71 has a processor 711 and a memory 713. The processor 711 performs a variety of processing and operates each portion including the plastication screw 13 and the injection plunger 43 according to processing results. In addition, to the starved feeder controller 73, the processor 711 gives a command of the rotational speed of the feed screw 53 and outputs an in-metering signal which indicates that the metering is being performed. The operating situations of each portion are fed back to the injection molding machine controller 71 by signals from the sensor, the encoder, the timer and the like arranged in each portion. The memory 713 stores the molding conditions input from an input device 77 or the operating situations. In addition, a display 79 displays the molding conditions or the operating situations. The input device 77 and the display 79 may be integrally configured, and can be configured as, for example, a control panel including a touch panel and input buttons.

As described above, the vent-up sensor 25 measures the height of the resin material with respect to any reference position in the vent hole 21, and sends measurement results to the injection molding machine controller 71. When the height of the resin material is equal to or greater than the predetermined threshold value which is optionally set, the injection molding machine controller 71 determines that the vent-up occurs, and switches the molding conditions from the normal conditions to the vent-up suppression conditions.

The starved feeder controller 73 rotates the feed screw 53 based on the predetermined rotational speed which is set as a molding condition. Besides, the feed screw 53 is rotated only in metering based on the in-metering signal.

The hopper loader controller 75 transports the resin material to the hopper 61 based on a signal from the material sensor 63. At this time, the hopper loader controller 75 closes the shutter 65, and closes the passage between the hopper 61 and the supply opening 511. After the transport of the resin material is completed, the hopper loader controller 75 drives and opens the shutter 65.

Here, the vent-up suppression conditions are described in detail. As a situation in which the vent-up occurs, for example, a case in which the amount of the resin material plasticized on the first stage is large compared with an amount of the resin material sent from the second stage to the injection cylinder 41, or a case in which the pressure of the resin material sent from the second stage to the injection cylinder 41 is not sufficient compared with a retreat resistance of the injection plunger 43 is considered. Therefore, it is considered that the occurrence of the vent-up can be suppressed by increasing the rotational speed of the plastication screw 13, reducing the rotational speed of the feed screw 53, or increasing the retreat speed of the injection plunger 43. In order to increase the retreat speed of the injection plunger 43, the back pressure may be reduced, or the retreat-metering described before may be used.

That is, the vent-up suppression conditions have one or more of the followings in any combination: increasing the rotational speed of the plastication screw 13 to be higher than that in the normal conditions; reducing the rotational speed of the feed screw 53 to be lower than that in the normal conditions; reducing the back pressure applied to the injection plunger 43 to be lower than that in the normal conditions (containing 0 Mpa); using the retreat-metering when the retreat-metering is not performed in the normal conditions; and increasing the retreat speed of the injection plunger 43 to be higher than that in the normal conditions when the retreat-metering is performed in the normal conditions. Besides, other conditions which are not included in the vent-up suppression conditions do not change from the normal conditions. Especially, in the screw preplasticating injection molding machine, the plastication device 1 and the injection device 4 are separated, and thus the rotational speed of the plastication screw 13 is easier to increase than that in the normal conditions. In addition, since the back pressure is not required to be applied to the injection plunger 43 in the screw preplasticating injection molding machine, it is easy to use the retreat metering, which is, so to speak, an operation that a negative back pressure is applied.

The pressure of the resin material sent from the second stage to the injection cylinder 41 can be increased by increasing the rotational speed of the plastication screw 13, and thus the occurrence of the vent-up is suppressed. In addition, the amount of the resin material plasticized on the first stage can be reduced by reducing the rotational speed of the feed screw 53, and thus the occurrence of the vent-up is suppressed. In addition, the retreat resistance of the injection plunger 43 during the metering can be reduced by increasing the retreat speed of the injection plunger 43, and thus the occurrence of the vent-up is suppressed.

Besides, determination of whether or not the vent-up occurs may be performed constantly during the molding, may be performed in the metering, or may be performed before the metering. In addition, the normal conditions may be switched immediately to the vent-up suppression conditions at the point when the vent-up is detected, or the normal conditions may be switched to the vent-up suppression conditions from a next metering after the vent-up is detected.

Molding according to the vent-up suppression conditions is performed at least until no vent-up is detected. After no vent-up is detected, the molding according to the vent-up suppression conditions may be continued until molding cycles of a predetermined number of times passes. After the molding according to the vent-up suppression conditions is completed, the molding conditions are switched again from the vent-up suppression conditions to the normal conditions, and the molding is continued. Besides, the molding cycle refers to a series of steps from starting of the metering of the resin material until an injection is completed and just before metering of the resin material related to a next injection is started.

Besides, after the molding according to the vent-up suppression conditions, condition correction may be performed in which the normal conditions are approximated to the vent-up suppression conditions. Hereinafter, for description, molding conditions in molding immediately before molding according to predetermined vent-up suppression conditions are referred to as normal conditions before correction; and molding conditions in molding immediately after the molding according to the predetermined vent-up suppression conditions are referred to as normal conditions after correction, in which the condition correction has been performed. If the rotational speed of the plastication screw 13 or the rotational speed of the feed screw 53 is changed, the pressure of the resin material for retreating the injection plunger 43 also changes. Therefore, when the condition correction is performed on at least one of the rotational speed of the plastication screw 13 and the rotational speed of the feed screw 53, and a condition in which the retreat speed of the injection plunger 43 increases, a correction in which the retreat speed of the injection plunger 43 increases is desirably performed after the rotational speed of the plastication screw 13 or the rotational speed of the feed screw 53 is corrected.

For example, the condition correction of the rotational speed of the plastication screw 13 is performed as described below. With reference to the operating situations stored in the memory 713, the processor 711 calculates: an average value pv1 [r/min] of the rotational speed of the plastication screw 13, a total value pt1 [min] of the rotation time of the plastication screw 13, and the number of cycles m1 [times] in molding according to the normal conditions before correction; and an average value pv2 [r/min] of the rotational speed of the plastication screw 13, a total value pt2 [min] of the rotation time of the plastication screw 13, and the number of cycles m2 [times] in the molding according to the vent-up suppression conditions. Here, the rotation time of the plastication screw 13 per cycle in the normal conditions after correction is assumed to be (pt1/m1) [min]. In fact, the rotation time of the plastication screw 13 per cycle in the normal conditions after correction is shorter than (pt1/m1) [min], but the difference is slight and thus is ignored. Based on a formula 1 described below, the processor 711 calculates a rotational speed pv3 [r/min] of the plastication screw in the normal conditions after correction, and performs the condition correction.

$$pv3 = \frac{pv1 \times pt1 + pv2 \times pt2}{m1 + m2} \div \frac{pt1}{m1} \quad \text{[Formula 1]}$$
$$= \frac{m1(pv1 \times pt1 + pv2 \times pt2)}{pt1(m1 + m2)}$$

The condition correction of the rotational speed of the plastication screw 13 may be performed by another method. For example, the rotational speed of the plastication screw 13 is increased by a predetermined amount or in a predetermined proportion within a range not exceeding a set value of the rotational speed of the plastication screw 13 in the vent-up suppression conditions, and thereby the condition correction of the rotational speed of the plastication screw 13 may be performed.

For example, the condition correction of the rotational speed of the feed screw 53 is performed as described below. With reference to the operating situations stored in the memory 713, the processor 711 calculates: an average value fv1 [r/min] of the rotational speed of the feed screw 53, a total value ft1 [min] of the rotation time of the feed screw 53, and the number of cycles m1 [times] in molding according to the normal conditions before correction; and an average value fv2 [r/min] of the rotational speed of the feed screw 53, a total value ft2 [min] of the rotation time of the feed screw 53, and the number of cycles m2 [times] in the molding according to the vent-up suppression conditions. Here, the rotation time of the feed screw 53 per cycle in the normal conditions after correction is assumed to be (ft1/m1) [min]. In fact, the rotation time of the feed screw 53 per cycle in the normal conditions after correction is longer than (ft1/m1) [min], but the difference is slight and thus is ignored. Based on a formula 2 described below, the processor 711 calculates a rotational speed fv3 [r/min] of the plastication screw in the normal conditions after correction, and performs the condition correction.

$$fv3 = \frac{fv1 \times ft1 + fv2 \times ft2}{m1 + m2} \div \frac{ft1}{m1} \quad \text{[Formula 2]}$$
$$= \frac{m1(fv1 \times ft1 + fv2 \times ft2)}{ft1(m1 + m2)}$$

The condition correction of the rotational speed of the feed screw 53 may be performed by another method. For example, the rotational speed of the feed screw 53 is reduced by a predetermined amount or in a predetermined proportion within a range not lower than a set value of the rotational speed of the feed screw 53 in the vent-up suppression conditions, and thereby the condition correction of the rotational speed of the feed screw 53 may be performed.

For example, the back pressure of the injection plunger 43 is reduced by a predetermined amount or in a predetermined proportion within a range not lower than a set value of the back pressure in the vent-up suppression conditions, and thereby the condition correction of the back pressure of the injection plunger 43 may be performed. Besides, when the vent-up suppression conditions have a condition for performing the retreat-metering, the back pressure may be gradually reduced and the retreat-metering may be performed at a stage where the back pressure becomes 0 Mpa, or the back pressure may be immediately reduced to 0 Mpa and the retreat-metering may be performed.

The condition correction of the retreat speed of the injection plunger 43 during the retreat-metering is performed as described below. If after the latest retreat-metering, there is a change in the molding conditions in which the metering time can be changed including the condition correction of the rotational speed of the plastication screw 13 and the condition correction of the rotational speed of the feed screw 53, the reference speed is calculated again by the methods described above and the like. Then, the retreat speed of the injection plunger 43 is increased by a predetermined amount or in a predetermined proportion within a range not exceeding the retreat speed in the vent-up suppression conditions.

Optimization of the normal conditions is gradually achieved by implementing this condition correction. Accordingly, the occurrence of the vent-up can be suppressed, and the molding can be performed more stably.

What is claimed is:

1. A method for injection molding of an injection molding machine, comprising:
   a step of supplying a resin material into a plastication cylinder of a plastication device, wherein a material inlet from which a resin material is supplied from a starved feeder including a feed cylinder and a rotatably provided feed screw and a vent hole from which gas is discharged are formed on the plastication cylinder, and a plastication screw is arranged to rotate freely in the plastication cylinder, and melts and sends the resin material supplied from the material inlet,
   a step of melting and sending the resin material by the plastication screw of the plastication device, a step of sending the resin material to an injection device which comprises an injection cylinder and an injection plunger, wherein the resin material is sent from the plastication cylinder to the injection cylinder through a junction which communicates the plastication cylinder and the injection cylinder, and the injection plunger is arranged to advance and retreat freely in the injection cylinder, retreats to meter the resin material, and advances to inject the resin material after metering;

a step of controlling at least the plastication screw and the injection plunger according to predetermined molding conditions by a controller, a step of switching from normal conditions to vent-up suppression conditions by the controller when the vent up is detected by a vent up sensor, and performing a control of molding by referring to operating situations that are fed back, wherein the normal conditions are the molding conditions which are normal, and the vent-up suppression conditions are the molding conditions for suppressing the vent-up, and the vent-up suppression conditions comprise the followings:

increasing a rotational speed of the plastication screw to be higher than a rotational speed of the plastication screw in the normal conditions, reducing a rotational speed of the feed screw to be lower than a rotational speed of the feed screw in the normal conditions, reducing a back pressure applied to the injection plunger to be lower than a back pressure applied to the injection plunger in the normal conditions, using retreat-metering when the retreat-metering is not performed in the normal conditions, wherein the retreat-metering is a control to apply, a force in a retreat direction in addition to a pressure of the resin material to the injection plunger to move the injection plunger at a predetermined retreat speed in the metering, and increasing the retreat speed of the injection plunger to be higher than the retreat speed of the injection plunger in the normal conditions when the retreat-metering is performed in the normal conditions.

2. The method for injection molding according to claim 1, wherein the retreat speed during the retreat-metering is a speed faster than a reference speed, and the reference speed is a retreat speed of the injection plunger when the injection plunger performs the metering while being retreated in a way that a sliding resistance is 0 Mpa in a state that a back pressure is not applied to the injection plunger.

3. The method for injection molding according to claim 1, wherein after no vent-up is detected, the vent-up suppression conditions are switched again to the normal conditions, and the control of molding is performed.

4. The method for injection molding according to claim 3, wherein after the control of molding according to the vent-up suppression conditions, the rotational speed of the plastication screw in the normal conditions is increased within a range not exceeding the rotational speed of the plastication screw in the vent-up suppression conditions, the retreat-metering is used in the normal conditions when the retreat-metering is not performed in the normal conditions immediately before the control of molding according to the vent-up suppression conditions, or the retreat speed of the injection plunger in the normal conditions is increased within a range not exceeding the retreat speed of the injection plunger in the vent-up suppression conditions when the retreat-metering is performed in the normal conditions immediately before the control of molding according to the vent-up suppression conditions.

5. The method for injection molding according to claim 1, wherein a supply opening from which the resin material is supplied and a discharge opening from which the resin material is discharged are formed on the feed cylinder, and the feed screw is arranged to rotate freely in the feed cylinder, sends the resin material supplied from the supply opening to the discharge opening, and supplies the resin material to the material inlet, and the vent-up suppression conditions further have reducing a rotational speed of the feed screw to be lower than a rotational speed of the feed screw in the normal conditions.

6. The method for injection molding according to claim 5, wherein after no vent-up is detected, the vent-up suppression conditions are switched again to the normal conditions, and the control of molding is performed.

7. The method for injection molding according to claim 6, wherein after the control of molding according to the vent-up suppression conditions, the rotational speed of the plastication screw in the normal conditions is increased within a range not exceeding the rotational speed of the plastication screw in the vent-up suppression conditions, the rotational speed of the feed screw in the normal conditions is reduced within a range not lower than the rotational speed of the feed screw in the vent-up suppression conditions, the retreat-metering is used in the normal conditions when the retreat-metering is not performed in the normal conditions immediately before the control of molding according to the vent-up suppression conditions, or the retreat speed of the injection plunger in the normal conditions is increased within a range not exceeding the retreat speed of the injection plunger in the vent-up suppression conditions when the retreat-metering is performed in the normal conditions immediately before the control of molding according to the vent-up suppression conditions.

8. The method for injection molding according to claim 5, wherein a hopper which supplies the resin material to the supply opening is installed on the supply opening, an openable/closeable shutter is arranged on the hopper or between the hopper and the supply opening, and the shutter is closed when the resin material is supplied to the hopper.

* * * * *